UNITED STATES PATENT OFFICE.

ANSIL MOFFATT, OF INDIANAPOLIS, INDIANA.

PIGMENT.

973,373.     Specification of Letters Patent.     Patented Oct. 18, 1910.

No Drawing.     Application filed December 29, 1909. Serial No. 535,426.

*To all whom it may concern:*

Be it known that I, ANSIL MOFFATT, a citizen of the United States, residing at the city of Indianapolis, in the county of Marion and State of Indiana, have invented certain new and useful Improvements in Pigments, of which the following is a specification.

This invention relates to a composition of matter consisting of a pigment composed of barium sulfate in a state of extreme subdivision.

The principal object of my invention is to produce an extremely finely subdivided barium sulfate in large quantities and in a very pure state directly from the natural mineral barium sulfate. It has long been well known that barium sulfate, when brought into a condition of extremely fine subdivision, may then be cleared from all impurities, as it is the finest imaginable powder and is not affected by any known acid. It is also well known to those familiar with the art that the pigments produced by the methods now in use fail to adequately answer the purposes of an ideal covering pigment, such as is desired in pure white paint. Both of the best known methods, one a mechanical method, and the other an indirect and costly chemical method, result in purified barium sulfate whose "body" or covering power is inadequate and which is possessed of little opacity.

In pursuance of a perfect pigment of barium sulfate, which should have an ideal body as a paint, and which should likewise be cheap, I have expended much time, effort and expense, with the result to be hereinafter set forth and claimed.

Generally speaking, my process of treatment consists in fusing or melting sodium sulfate, or any other suitable salt, with barium sulfate, until the latter enters into a complete state of solution or alloy with said salt, and thereby becomes extremely finely subdivided. When the fused or melted mixture is cooled, the salt, being a soluble one, may be dissolved away from the barium sulfate, which latter being insoluble will remain behind in a state of extreme subdivision, to be prepared for commerce in any form, as requirements dictate.

In the foregoing paragraph, and in the succeeding parts of my specification, I refer to the barium sulfate as being "extremely finely subdivided." This is a term which I use to indicate the extreme subdivision of the barium sulfate which I succeed in producing by my process, in distinguishing it from the ordinary powdered barium sulfate heretofore produced by other methods. The principal evidence of this extreme subdivision is found in the adequate and thorough covering power and complete opacity of my product when used as a paint pigment.

My preferred method of treating barium sulfate is as follows: I take the natural form of barium sulfate (variously known under the names of barite, barytes, heavy spar or tiff) and mix it suitably with sodium sulfate, this being both an economical and efficient solvent for barium sulfate and having a low fusing or melting point. The temperature or point of fusion will be high or low according to the proportion of sodium sulfate in the mixture, and the proportion of sodium sulfate used is of such quantity that the two sulfates will be in molecular proportion, or the alkali sulfate or salt sulfate may be in excess, so that the fused or melted alloy will become homogeneous at an early period. The mixture of barium sulfate and sodium sulfate is heated in an appropriate vessel until fusion occurs, and is maintained in a state of fusion until the alloy or solution is homogeneous or complete. Upon reaching this complete state of alloy, the fused mixture is withdrawn and suitably cooled. The cooling process may be carried on either by pouring the mixture out to cool, or by pouring it into water in a gradual stream. Whichever method is used, the congealed product is then boiled in water to dissolve the salt or alkali sulfate, and to precipitate the barium sulfate. The water thus used, and containing the dissolved alkali sulfate is then removed for other use, preferably to be boiled down to recover the alkali sulfate for future re-use. The precipitate of barium sulfate thus remaining, by reason of its insolubility in water, is the extremely subdivided product sought for by my process. As a final step in its production, it may be suitably treated by a process of washing and bleaching. It is washed in a water bath, to remove any impurities of a solid nature which may remain, and may be treated with small quantities of acid to remove any coloring impurities. The purified barium sulfate may be drained and dried and suitably packed.

While I have specified the use of sodium sulfate as the solvent in the description of my process, it is possible to use any of the common salts to produce a more or less solvent effect on barium sulfate. However, practical experiments of an extended nature have shown sodium sulfate and potassium sulfate to be the most practicable and satisfactory salts.

The result produced by the process above set forth is a pigment of superior quality, especially suitable for use as a paint pigment. Extended experiment has shown the fact that a perfect pigment, chemically produced and subdivided in an exceptionally high degree, may be supplied to enter commerce at a cost approximating $20.00 per ton. This product is derived from the mineral or natural barytes or "tiff" and is the result entirely of the process hereinbefore described. Its cost of production is small, by reason of the comparative simplicity, and ease of installation, of the apparatus necessary, and by reason of the general commercial quantities in which the necessary solvent can be obtained.

It is evident, from the foregoing, that the improved composition above described answers in all particulars the requirements of a perfect pigment, and realizes the object of those who have for a long time realized the adequacy of a very finely subdivided barium sulfate as a paint pigment, but have been unable to produce the same in proper quality or quantity. The composition produced by my process possesses a very finely subdivided body, and consequently a fine covering power possessing absolute opacity, and capable of proper production in commercial quantities and at a reasonable cost.

Having thus fully described my invention what I claim and desire to secure by Letters Patent of the United States, is:—

1. A pigment body consisting of barium sulfate precipitate from an alloy of natural barium sulfate and an alkaline sulfate.

2. A pigment body consisting of barium sulfate precipitated from an alloy of natural barium sulfate and sodium sulfate.

In testimony whereof I have affixed my signature in presence of two witnesses.

ANSIL MOFFATT.

Witnesses:
 EDWARD A. FORD,
 WILLIAM C. BLISS.